United States Patent
Kim et al.

(10) Patent No.: US 9,688,802 B2
(45) Date of Patent: Jun. 27, 2017

(54) POLY(ETHYLENE-ALIPHATIC DIENE)-G-POLYSTYRENE BASED COPOLYMER HAVING IMPROVED MECHANICAL PROPERTIES AND HEAT RESISTANCE AND METHOD FOR PREPARING SAME

(71) Applicant: KOREA INSTITUTE OF INDUSTRIAL TECHNOLOGY, Cheonan-si (KR)

(72) Inventors: Dong Hyun Kim, Gunpo-si (KR); No Hyung Park, Anyang-si (KR); Jung Soo Kim, Wonju-si (KR); Dong Gyu Jeon, Incheon (KR)

(73) Assignee: KOREA INSTITUTE OF INDUSTRIAL TECHNOLOGY, Cheonan-Si (KR)

( * ) Notice: Subject to any disclaimer, the term of this patent is extended or adjusted under 35 U.S.C. 154(b) by 0 days.

(21) Appl. No.: 14/909,167

(22) PCT Filed: May 23, 2014

(86) PCT No.: PCT/KR2014/004618
§ 371 (c)(1),
(2) Date: Feb. 1, 2016

(87) PCT Pub. No.: WO2015/023047
PCT Pub. Date: Feb. 19, 2015

(65) Prior Publication Data
US 2016/0168301 A1 Jun. 16, 2016

(30) Foreign Application Priority Data
Aug. 16, 2013 (KR) .................. 10-2013-0097047

(51) Int. Cl.
*C08F 279/00* (2006.01)
*C08F 255/02* (2006.01)

(52) U.S. Cl.
CPC .......... *C08F 279/00* (2013.01); *C08F 255/02* (2013.01)

(58) Field of Classification Search
CPC ..... C08F 255/00; C08F 255/02; C08F 279/00; C08F 279/02; C08F 287/00
See application file for complete search history.

(56) References Cited

U.S. PATENT DOCUMENTS 3,483,273 A * 12/1969 Christenson .......... C08F 255/00
525/285

FOREIGN PATENT DOCUMENTS

| KR | 10-1995-0087222 | 8/1995 |
| KR | 100457940 | 11/2004 |
| WO | 2011111656 | 9/2011 |

OTHER PUBLICATIONS

Guo, Fang et al. 'Scandium-Catalyzed Cyclocopolymerization of 1,5-Hexadiene with Styrene and Ethylene:Efficient Synthesis of Cyclopolyolefins Containing Syndiotactic Styrene-Styrene Sequences and Methylene-1,3-cyclopentane Utits, Macromolecules, 2011, 44, pp. 6335-6344.

* cited by examiner

*Primary Examiner* — Irina S Zemel
*Assistant Examiner* — Jeffrey Lenihan
(74) *Attorney, Agent, or Firm* — Lex IP Meister, PLC

(57) ABSTRACT

The present invention relates to a poly(ethylene-aliphatic diene)-g-polystyrene-based copolymer having an improved mechanical property and heat resistance, and a method for preparing the same. More particularly, the present invention relates to a poly(ethylene-aliphatic diene)-g-polystyrene-based copolymer, which includes an ethylene-aliphatic diene copolymer as a soft segment and a polystyrene-based polymer grafted to the soft segment as a hard segment, and a method for preparing the same. The poly(ethylene-aliphatic diene)-g-polystyrene-based copolymer has elasticity equivalent to that of SBS or SEBS, and improved mechanical properties such as tensile strength and heat resistance, thereby being used as a substituent for SBS or SEBS.

9 Claims, No Drawings

POLY(ETHYLENE-ALIPHATIC DIENE)-G-POLYSTYRENE BASED COPOLYMER HAVING IMPROVED MECHANICAL PROPERTIES AND HEAT RESISTANCE AND METHOD FOR PREPARING SAME

TECHNICAL FIELD

The present disclosure relates to a poly(ethylene-aliphatic diene)-g-polystyrene-based copolymer and a method for preparing the same, wherein the copolymer is designed to have a hard segment grafted to a soft segment, thereby improving heat resistance compared to TPE.

BACKGROUND ART

A thermoplastic elastomer (TPE) includes a soft segment having elasticity and a hard segment to prevent thermoplastic deformation in molecules. TPEs can be a subject of a shaping process during processing like a thermoplastic plastic, and have elasticity of thermosetting rubber at room temperature. By properly designing soft and hard segments, various physical properties may be obtained.

TPEs have been used in many different fields such as shoes, sticking agents, adhesives, automobiles, industrial products, architecture•civil engineering•ocean, wires•cables, electronics•electricals, sport equipment, packing materials, and medicinal products, etc. Also, TPEs have been massively used as a commercialized material of a plastic improver or polymer alloy. TPEs are used for electronic•electrical components or cameras through the alloy. Besides, TPEs have received much attention, because TPEs confer functions such as conductivity, photosensitivity, and selective isolation, thereby being used for high functional use in the electronic optical field, medicinal field, and printing fields. Particularly, the application to medicinal products as a high purity rubber material without the use of vulcanizing agents has been mostly noted and developed.

During the development and study of TPE products, through combination of types, molecular weights, and arrangement of the soft and hard segments, high performance and high functionality have been studied. Also, TPEs have been gradually varied and diversified. Further, needs for TPEs has been increased every year due to rising concerns about environment and continuous development of uses, and therefore the markets are actively expanded.

Depending on used materials, TPEs have been divided into olefin-based (thermoplastic olefinic elastomer, TPO), styrene-based (thermoplastic styrenic block copolymer, SBC), urethane-based (thermoplastic polyurethane, TPU), amide-based (thermoplastic polyamide, TPAE), and polyester-based (thermoplastic polyester elastomer, TPEE), etc.

Most of the olefin-based TPE are block copolymer in which hard polypropylene, polystyrene, polyethylene, nylon, styrene-acrylonitrile and soft ethylene propylene diene rubber (EPDM), natural rubber, and styrene-butadiene rubber (SBR) are copolymerized. The block copolymer of the olefin-based TPE is mainly a random copolymer. Recently, a method has been suggested in which a metallocene catalyst is used or living polymerization is introduced to improve the physical property (see Korean Patent Publication No. 2012-0052385, and 2011-0114475, olefin-based diene copolymer).

As the styrene-based TPE, polystyrene polybutylene binary copolymer (SBS), polystyrene/poly(ethylene-propylene)/polystyrene tercopolymer (SEPS), polystyrene/poly(ethylene-butylene))/polystyrene tercopolymer (SEBS) are manufactured and merchandised by Clayton Polymers Ltd. under the registered trade name of "clayton". Commercially available similar products include several such as solprene series and calprene series from Diansol Co., and products from Septone Co.

The styrene content of the above mentioned products is 10 to 40 wt % depending on required degree of strength and heat resistance. However, since the commercialized product contains polystyrene as a block copolymer form, there exists limitation in improvement of heat resistance due to glass transition temperature of polystyrene (100° C.) even in the case where the styrene content is increased.

Thus, there still remains difficulty in the application to a field which requires high heat resistance such as automobile components including CVJ boot and hose, or codes used in electronic components, and connectors of portable devices.

DISCLOSURE OF THE INVENTION

Technical Problem

As a result of studying a material capable of substituting TPE such as SBS or SEBS in various ways, the present inventors have complete the present invention by manufacturing a copolymer having a novel structure in which a hard segment is grafted to a soft segment, and finding that the copolymer has a greatly improved mechanical property and heat resistance, while maintaining elasticity equal to or greater than that of SBS or SEBS.

Therefore, an object of the present invention is to provide a poly(ethylene-aliphatic diene)-g-polystyrene-based copolymer, which may be applied to various fields as TPE such as SBS or SEBS, and a method for preparing the poly(ethylene-aliphatic diene)-g-polystyrene-based copolymer.

Technical Solution

In order to achieve the objects, the present invention provides a poly(ethylene-aliphatic diene)-g-polystyrene-based copolymer represented by the following Formula 1:

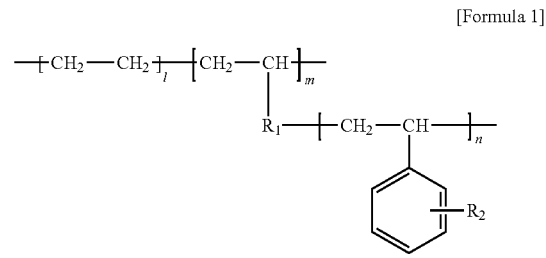

[Formula 1]

(wherein, $R_1$, $R_2$, l, m, and n are the same as those described in the specification).

Also, as shown in Reaction Formula 1 below, the present invention provides a method of preparing a poly(ethylene-aliphatic diene)-g-polystyrene-based copolymer of Formula 1 prepared by:

a) polymerizing an aliphatic diene monomer and ethylene to prepare an ethylene diene copolymer; and b) performing graft polymerization of the ethylene diene copolymer and a styrene-based monomer.

[Reaction Formula 1]

(a) 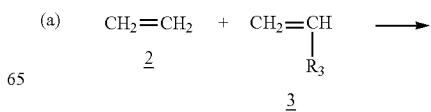

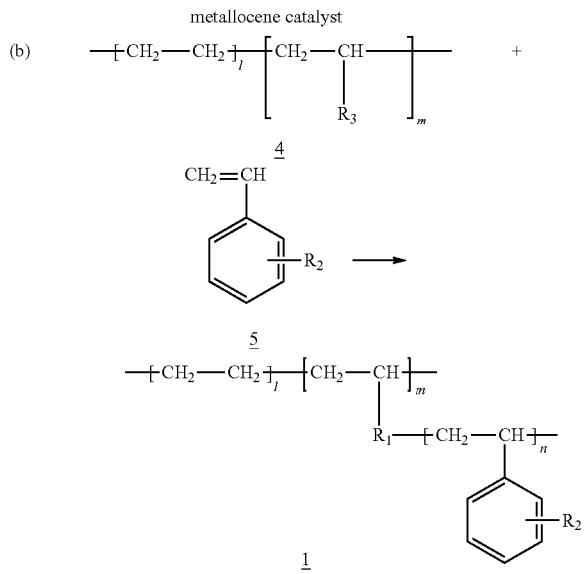

(wherein, $R_1$, $R_2$, $R_3$, l, m, and n are the same as those described in the specification).

Advantageous Effects

The poly(ethylene-aliphatic diene)-g-polystyrene-based copolymer of the present invention has a structure in which a soft segment and a hard segment are grafted such that mechanical properties such as tensile strength, elongation rate, as well as heat resistance are improved, while maintaining elasticity equal to or greater than that of commercially available SBS or SEBS, thereby being applied to various fields as TPE.

MODE FOR CARRYING OUT THE INVENTION

Hereinafter, the present invention will be described in more detail.

Herein, provided is a graft copolymer having greatly improved heat resistance and mechanical properties than typical styrene-based and olefine-based TPEs by combining a composition and arrangement of a hard segment and a soft segment. Preferably, the graft copolymer is a poly(ethylene-aliphatic diene)-g-polystyrene-based copolymer represented by the following Formula 1:

[Formula 1]

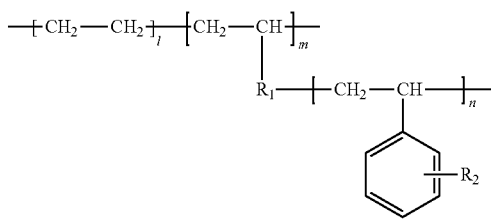

(wherein, $R_1$ is a C2-C20 straight or branched chain alkylene group;

$R_2$ is a C1-C10 straight or branched chain alkyl group; and l, m, and n are each independently an integer from 10-10,000).

The poly(ethylene-aliphatic diene)-g-polystyrene-based copolymer of Formula 1 has an ethylene-diene copolymer as a soft segment which includes diene to which a styrene-based polymer, as a hard segment, is grafted.

The poly(ethylene-aliphatic diene) copolymer, which is a soft segment, is a block copolymer in which ethylene represented by $—[CH_2—CH_2]_l—$ block and an aliphatic diene monomer represented by $—[CH_2—CH(—R_1-)]m-$ are copolymerized. $R_1$ is a C2-C20 alkylene group unsubstituted or substituted with a C1-C18 alkyl group. As an example, $R_1$ is an alkyl group such as ethyl, propyl, isopropyl, butyl, pentyl, hexyl, heptyl, octyl, and nonyl in which hydrogen is removed, i.e. those having a double bond, and $R_1$ may be substituted with at least one alkyl group of methyl, ethyl, propyl, isopropyl, butyl, pentyl, hexyl, heptyl, octyl, and nonyl.

The available aliphatic diene monomer constituting a diene block includes C4-C20 diene-based monomer such as 1,3-butadiene, isoprene, 2,3-dimethyl-1,3-butadiene, 1,2-dimethyl-1,3-butadiene, 1,4-dimethyl-1,3-butadiene, 1-ethyl-1,3-butadiene, 3-butyl-1,3-octadiene, 1,3-hexadiene, 4-methyl-1,3-pentadiene, 1,3-pentadiene, 3-methyl-1,3-pentadiene, 2,4-dimethyl-1,3-pentadiene, 3-ethyl-1,3-pentadiene. In the example of the present invention, 1,3-butadiene is used.

The aliphatic diene monomer has two double bond one of which is used for polymerization with ethylene to form a soft segment constituting a main chain, and another one is used as a linking point where the styrene block constituting a hard segment as described below is linked.

As a diene-based monomer of typical TPE, unconjugated diene including unconjugated polyene such as vinyl isopropenyl benzene or divinyl benzene is mainly used. However, the aliphatic diene monomer is used in the present invention, leading to advantages of easier processing and better flexibility and elasticity compared to the typical unconjugated diene monomer.

In addition, a polystyrene-based polymer represented by $—[CHCH(C_6H_5R_2)]—$ is available as a hard segment. The polystyrene-based polymer has a glass transition temperature (Tg of about 75° C.) higher than room temperature, thereby increasing heat resistance of the copolymer. $R_2$ is a C1-C10 straight or branched chain alkyl group which is unsubstituted or substituted with a C1-C18 alkyl group. As an example, $R_2$ is an alkyl group such as ethyl, propyl, t-butyl, butyl, pentyl, hexyl, heptyl, octyl, and nonyl, which may be substituted with at least one alkyl group of methyl, ethyl, propyl, isopropyl, butyl, pentyl, hexyl, heptyl, octyl, or nonyl.

In particular, since the polystyrene-based polymer is linked through grafting rather than in a form of tercopolymer of ethylene-diene-styrene, excellent heat resistance and mechanical properties may further be ensured.

The available styrene-based monomer constituting the polystyrene-based polymer includes styrene, methyl styrene, ethyl styrene, propyl styrene, isopropyl butyl styrene, and pentyl styrene. In the example of the present invention, styrene, and butyl styrene are used.

The poly(ethylene-aliphatic diene)-g-polystyrene-based copolymer has a soft segment of a rubber phase of poly (ethylene-aliphatic diene) having low glass transition temperature. The polystyrene-based polymer forms a hard domain and has a high glass transition temperature. The poly(ethylene-aliphatic diene)-g-polystyrene-based copolymer may be used a substituent for TPE by controlling the parameters of the composition.

The physical property may be controlled by adjusting parameters such as the ratio of the soft segment and hard segment (i.e., grafting rate), weight average molecular weight and molecular weight distribution.

Preferably, the weight average molecular weight of the poly(ethylene-aliphatic diene) copolymer is adjusted to 10,000-1,000,000, and the weight average molecular weight of the polystyrene-based copolymer is adjusted to 10,000-500,000. The molecular weight distribution preferably falls within a range of 1.2-3.0. In addition, the weight average molecular weight of the poly(ethylene-aliphatic diene)-g-polystyrene-based copolymer falls within a range of 20,000-1,500,000.

In particular, the polystyrene-based polymer content is important for improving heat resistance. The graft rate is preferably 0.01-10%, and more preferably 0.1-3%. When the graft rate is below the range, the ratio of the soft segment is too large to ensure sufficient heat resistance of the graft copolymer. On the contrary, when the graft rate is above the range, the ratio of the hard segment is large such that cross-linking occurs during the polymerization process, leading to gelation.

As described in the following Reaction Formula 1, the poly(ethylene-aliphatic diene)-g-polystyrene-based copolymer of Formula 1 according to the present invention is prepared by:

a) polymerizing ethylene (Formula 2) and an aliphatic diene monomer (Formula 3) to prepare an ethylene-diene copolymer (Formula 4); and b) performing graft polymerization of the ethylene-diene copolymer (Formula 4) with a styrene-based monomer (Formula 5).

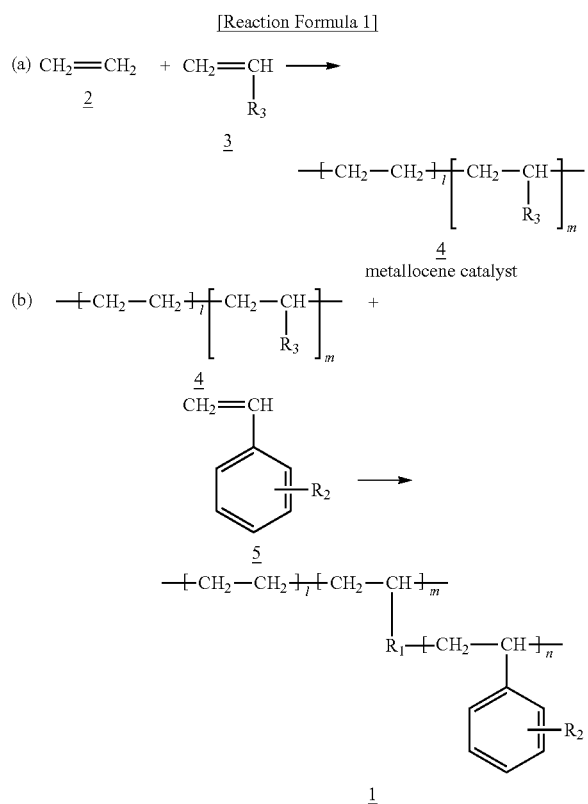

(wherein, $R_1$ is a C2-C20 straight or branched chain alkylene group;

$R_2$ is a C1-C20 straight or branched chain alkyl group;

$R_3$ is a C2-C20 straight or branched chain alkenyl group; and l, m, and n are each independently an integer from 10-10,000).

Hereinafter, each step will be described in more detail.

At first, in step a), ethylene represented by Formula 2 and an aliphatic diene monomer represented by Formula 3 are polymerized to prepare an ethylene-diene copolymer represented by Formula 4.

For the polymerization, any one of bulk polymerization, solution polymerization, emulsion polymerization, suspension polymerization, and vapor polymerization may be used, and all of step polymerization, chain polymerization, ion polymerization, radical polymerization and coordination polymerization may be used as a mechanism. Preferably, coordination polymerization using a metallocene catalyst is used.

Since the metallocene catalyst has a homogenous active site, there are advantage in that molecular weight distribution of the polymer is narrow; copolymerization is easy; and distribution of copolymerized diene is also homogeneous.

The used metallocene catalyst is not particularly restricted in the present invention, but includes any catalyst used in olefin-based polymerization. As an example, the metallocene catalyst has a metallocenter which is a group 4 transition metal, and the ligand is cyclopentadienyl or a derivative thereof, fluorenyl or a derivative thereof, or indenyl or a derivative thereof, wherein the catalyst has a bridge (ansa) structure or non-bridge structure. In terms of activity of the catalyst in the polymerization, the metallocenter of the metallocene catalyst is preferably Ti or Zr; the ligand is preferably indenyl or a derivative thereof; and the structure of the catalyst is preferably bridge (ansa) structure.

The amount of added metallocene catalyst may be determined within a range allowing sufficient polymerization to occur, and not particularly restricted. As an example, $10^{-8}$ to 1 mol/L, and preferably $10^{-7}$ to $10^{-1}$ mol/L is available per unit volume (L) of the monomer based on the concentration of metallocenter (M) of the transition metal compound.

Such polymerization may be performed as a bath type, semi-continuous type, or continuous type reaction. However, any one allowing coordination polymerization may be used.

A temperature and pressure condition of a reactor where the polymerization occurs may be determined by considering polymerization efficiency depending on types of reactors and types of reaction to which the condition is applied, thereby not being particularly restricted. For example, the polymerization step may be performed at −50 to 500° C., and preferably 0 to 150° C., under a pressure of 1 to 3000, and preferably a pressure of 1 to 500.

In the method of preparing poly(ethylene-aliphatic diene) copolymer, the microstructure of the copolymer may be easily controlled by using the above-described metallocene catalyst. Thus, the poly(ethylene-aliphatic diene) copolymer having a relatively high diene-comonomer content and molecular weight and a desired property may be prepared.

In other word, the ratio of the aliphatic diene monomer content to ethylene polymerized in the poly(ethylene-aliphatic diene) copolymer may be 1:0.1 to 1:10, preferably 1:0.1 to 1:5, and more preferably 1:0.1 to 1:3. Consequently, the obtained poly(ethylene-aliphatic diene) copolymer may have a weight average molecular weight (Mw) of 10,000-1,000,000, and preferably 30,000-500,000.

The solvent used in the polymerization is not particularly restricted in the present invention.

The solvent may be any hydrocarbon which does not react with a terminal chain of the coordination polymer, is easily handled in a commercial polymerizing device, and provides an appropriate soluble characteristic for the polymer product. For example, in particular, aromatic hydrocarbon is generally used as a suitable solvent. Toluene, benzene, and xylene are commonly used, and all of which are relatively non-polar. As other suitable solvents, the solvent known to a person skilled in the art and effective under a certain set of treating condition may be selected. Further, temperature is one of the major factors to be considered.

Then, in step b), graft polymerization of the poly(ethylene-aliphatic diene) copolymer of Formula 4 with a styrene-based monomer of Formula 5 was performed to prepare a graft copolymer of Formula 1.

The poly(ethylene-aliphatic diene) copolymer prepared in step a) has a double bond at a branch due to diene (i.e. vinyl group) which acts as an activate site enabling grafting with the styrene-based monomer to initiate. The graft polymerization is performed via the active site.

In the graft polymerization, polymerization is performed by: adding the poly(ethylene-aliphatic diene) copolymer and the styrene monomer in a reactor; and initiating the reaction by an initiator. Any polymerization including bulk polymerization, solution polymerization, emulsion polymerization, suspension polymerization, slurry polymerization, and vapor polymerization is available, and all of step polymerization, chain polymerization, ion polymerization, radical polymerization, and coordination polymerization may be used as a mechanism. Preferably, coordination polymerization using a metallocene catalyst is used.

As already mentioned above, the coordination polymerization in the graft polymerization of this step is advantageous in that the molecular weight is easily adjusted and a graft chain of the styrene-based polymer having a narrow molecular weight distribution may be formed.

The polymerization condition of the graft polymerization step, and the metallocene catalyst and solvent used in the step are the same as those mentioned in a).

The weight average molecular weight of the polystyrene-based polymer grafted by the step is preferably 10,000-500,000. When the molecular weight is below the range, the domain size of the styrene-based polymer block is too small to expect an improvement in heat resistance and mechanical properties of the prepared graft copolymer. When the molecular weight is above 500,000, there is restriction in elasticity of the finally obtained graft copolymer (as a TPE).

The poly(ethylene-aliphatic diene)-g-polystyrene-based copolymer according to the present invention may be used as a substituent for TPE. In particular, when compared with commercially available SBS or SEBS, mechanical properties such as tensile strength, and elongation, as well as heat resistance are improved, while maintaining the elastic characteristic similar to that of SBS or SEB. Therefore, the poly(ethylene-aliphatic diene)-g-polystyrene-based copolymer may be applied to various fields as TPE such as SBS or SEBS.

For example, the graft copolymer may be variously applied to shoes, sticking agents, adhesives, automobiles, industrial products, architecture, civil engineering, ocean, wires, cables, electronics, electrical, sport equipment, packing materials, medicinal products, printings, and commercialized agents.

Hereinafter, the present invention will be described in more detail with reference to examples below. These examples are only examples to specifically describe the present invention, and the scope of the present invention is not limited to the examples.

EXAMPLE 1

Synthesis of Poly(Ethylene-1,5-Hexadiene)-g-Poly(t-Butylstyrene)

(1) Preparation of Poly(Ethylene-1,5-Hexadiene)

400 mL of toluene and 20.53 g (0.25 mol) of 1,5-hexadiene and ethylene were added to a 500 mL 2-neck reactor under 0.4 MPa for 30 minutes.

2.5 mol of 1,2,4-trimethyl cyclopentadienyl 2,6-isopropyl aryl oxotitanium dichloride, as a catalyst, and methylaluminoxane, as a cocatalyst, were dissolved in toluene to prepare a catalyst solution, wherein the molar ratio of introduced methylaluminoxane was adjusted to 3000 times of that of the catalyst.

The temperature of the reactor was maintained at 50° C., and the prepared catalyst solution was added to the reactor. Polymerization proceeded for 30 minutes.

(2) Preparation of Poly(Ethylene-1,5-Hexadiene)-g-Poly(t-Butylstyrene) Copolymer 12.3 g (16.3 ml, 0.8 mol) of t-butylstyrene was continuously introduced to the polymerization system. Then, 2.5 mol of 1,2,4-trimethyl cyclopentadienyl 2,6-isopropyl aryl oxotitanium dichloride, as a catalyst, and methylaluminoxane, as a cocatalyst, were dissolved in toluene to prepare a catalyst solution, and the solution was introduced, wherein the molar ratio of introduced methylaluminoxane was adjusted to 3000 times of that the catalyst. The reaction proceeded for 20 minutes while temperature of the reactor was maintained at 60° C. Then, methanol and hydrochloric acid were directly added to terminate the polymerization. Subsequently, the reactant was separated and dried under reduced pressure for 6 hours at 60° C. to give poly(ethylene-1,5-hexadiene)-g-poly(t-butylstyrene) copolymer. The prepared poly(ethylene-1,5-hexadiene)-g-poly(t-butylstyrene) copolymer was used in the next step without a further purification process.

EXAMPLE 2

Preparation of Poly(Ethylene-1,5-Hexadiene)-g-Poly(A-Methylstyrene) Copolymer

A poly(ethylene-1,5-hexadiene)-g-poly($\alpha$-methylstyrene) copolymer was prepared through the same method as Example 1 except that $\alpha$-methylstyrene was used instead of t-butylstyrene as a graft monomer.

EXAMPLE 3

Poly(Ethylene-1,7-Decadiene)-G-Poly(A-Methylstyrene) Copolymer

A poly(ethylene-1,7-decadiene)-g-poly($\alpha$-methylstyrene) copolymer was prepared through the same method as Example 1 except that 1,7-decadiene was used instead of 1,5-hexadiene as a monomer.

EXPERIMENTAL EXAMPLE 1

Measurement of Molecular Weight of Copolymer

To evaluate the molecular weight characteristic of the copolymers prepared in Examples 1 to 3, analysis was performed by using high temperature GPC. The obtained result is shown in Table 1.

The molecular weight distribution (Mw/Mn) and the weight average molecular weight (Mw) of the poly(ethylene-aliphatic diene)-g-poly(t-styrene) copolymer were obtained by using gel permeation chromatography (GPC, Polymer Laboratories Co., PL-GPC 210 device). The measuring temperature was 140° C.

TABLE 1

|  | Weight average molecular weight (Mw) | Molecular weight distribution (Mw/Mn) |
|---|---|---|
| Example 1 | 305,000 g/mol | 2.7 |
| Example 2 | 340,000 g/mol | 2.8 |
| Example 3 | 345,000 g/mol | 2.8 |

Referring to Table 1, the copolymers prepared in the present invention are copolymers having vary narrow molecular weight distribution.

EXPERIMENTAL EXAMPLE 2

Physical Property Analysis

To compare physical properties of the copolymers prepared in Examples, mechanical properties and heat resistance were tested, and the obtained results are shown in Table 2. As a Comparative Example, commercially available SBS (Comparative Example 1, styrene-butadiene-styrene copolymer, K9152, KUMHO PETROCHEMICAL) or SEBS (Comparative Example 2, styrene-ethylene-butadiene-styrene, KTR-201, KUMHO PETROCHEMICAL) were used.

(1) Thermal decomposition temperature ($T_{90}$): temperature at which 90% of sample was decomposed was measured by using thermogravimetric analysis (TGA).

(2) Glass transition temperature (Tg): Tg of a hard segment of an elastomer was measured by using differential scanning calorimeter (DSC).

(3) Tensile strength (kgf/cm$^2$): measurement was performed according to ASTM D412 method, and the test temperature was set to 23° C., and the crosshead rate was set to 200 mm/min.

(4) Elongation rate (%): measurement was performed according to ASTM D412 method, and the test temperature was set to 23° C., and the crosshead rate was set to 200 mm/min.

(5) Elongation modulus: measurement was performed according to STM D412.

(6) Compression set: measurement was performed according to ASTM D395 under 22 hours at 70° C. condition.

Referring to Table 2 above, it can be found that the copolymers obtained in Examples 1 to 3 of the present invention have the elongation rate equal to or greater than commercially available SBS or SEBS, and at most 25% of compression set, indicating an excellent elastic characteristic.

In particular, the copolymers of Examples 1 to 3 have thermal decomposition temperature greater than that of SBS or SEBS, thereby being applicable to various products requiring heat resistance, and also exhibiting an improved tensile strength and modulus.

The invention claimed is:

1. A poly(ethylene-aliphatic diene)-g-polystyrene-based copolymer represented by the following Formula 1:

[Formula 1]

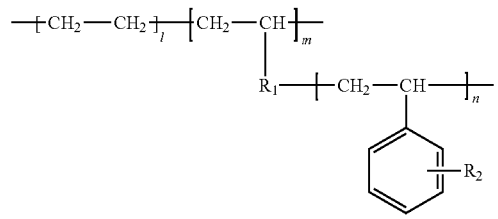

(wherein, $R_1$ is a C2-C20 straight or branched chain alkylene group; $R_2$ is a C1-C10 straight or branched chain alkyl group; and l, m, and n are each independently an integer from 10-10,000).

2. The poly(ethylene-aliphatic diene)-g-polystyrene-based copolymer of claim 1, wherein the weight average molecular weight of the graft copolymer is 20,000-1,500,000 and the molecular weight distribution is 1.2-3.0.

3. The poly(ethylene-aliphatic diene)-g-polystyrene-based copolymer of claim 1, wherein the graft copolymer has a graft rate of 0.01-10%.

4. The poly(ethylene-aliphatic diene)-g-polystyrene-based copolymer of claim 1, wherein the weight average molecular weight of the poly(ethylene-aliphatic diene) block of the graft copolymer is 10,000-1,000,000 and the weight average molecular weight of the polystyrene-based block is 10,000-800,000.

5. A poly(ethylene-aliphatic diene)-g-polystyrene-based copolymer represented by the following Formula 1:

[Formula 1]

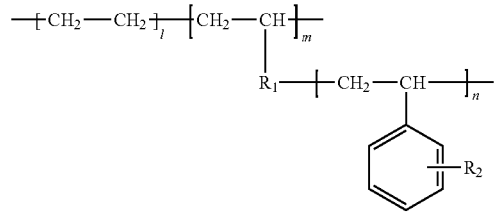

TABLE 2

|  | Thermal decomposition temperature (° C.) | Glass transition temperature (° C.) | Tensile strength (kgf/cm2) | Elongation rate (%) | Elongation modulus (kgf/cm2) | Compression set |
|---|---|---|---|---|---|---|
| Example 1 | 320 | 151 | 380 | 550 | 67 | <25% |
| Example 2 | 325 | 175 | 420 | 540 | 72 | <25% |
| Example 3 | 330 | 180 | 450 | 550 | 80 | <25% |
| Comparative Example 1 | 230 | 95 | 200 | 550 | 45 | <25% |
| Comparative Example 2 | 270 | 91 | 350 | 500 | 50 | <25% |

(wherein $R_1$ is a C2-C20 straight or branched chain alkylene group unsubstituted or substituted with a C1-C18 alkyl group; $R_2$ is a C1-C10 straight or branched chain alkyl group unsubstituted or substituted with a C1-C18 alkyl group; and l, m, and n are each independently an integer from 10-10,000).

6. A method for preparing a poly(ethylene-aliphatic diene)-g-polystyrene-based copolymer of Formula 1 as described in Reaction Formula 1 below, the method comprising:
   a) polymerizing ethylene (Formula 2) and an aliphatic diene monomer (Formula 3) to prepare an ethylene-diene copolymer (Formula 4); and
   b) performing coordination polymerization of a styrene-based monomer (Formula 5) with the ethylene-diene copolymer (Formula 4) in the presence of a metallocene catalyst.

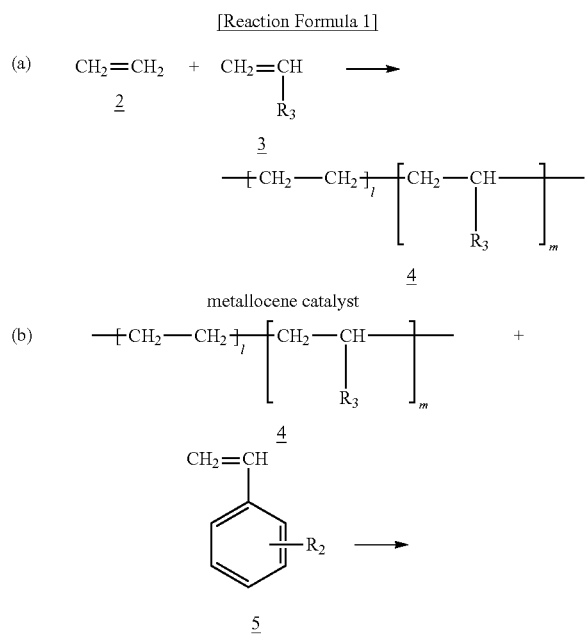

-continued

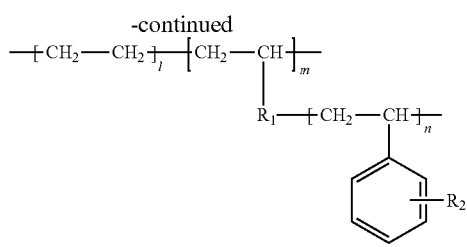

1

(wherein, $R_1$ is a C2-C20 straight or branched chain alkylene group; $R_2$ is a C1-C10 straight or branched chain alkyl group; $R_3$ is a C2-C20 straight or branched chain alkenyl group; and l, m, and n are each independently an integer from 10-10,000).

7. The method for preparing a poly(ethylene-aliphatic diene)-g-polystyrene-based copolymer of claim 6, wherein the aliphatic diene monomer comprises at least one selected from the group consisting of 1,3-butadiene, isoprene, 2,3-dimethyl-1,3-butadiene, 1,2-dimethyl-1,3-butadiene, 1,4-dimethyl-1,3-butadiene, 1-ethyl-1,3-butadiene, 3-butyl-1,3-octadiene, 1,3-hexadiene, 1,5-hexadiene, 1,9-octadiene, 1,7-octadiene, 1,9-decadiene, 4-methyl-1,3-pentadiene, 1,3-pentadiene, 3-methyl-1,3-pentadiene, 2,4-dimethyl-1,3-pentadiene, 3-ethyl-1,3-pentadiene and combination thereof.

8. The method for preparing a poly(ethylene-aliphatic diene)-g-polystyrene-based copolymer of claim 6, wherein the styrene-based monomer comprises at least one selected from the group consisting of methyl styrene, ethyl styrene, propyl styrene, t-butyl styrene, isopropyl butyl styrene, pentyl styrene, and combination thereof.

9. The method for preparing a poly(ethylene-aliphatic diene)-g-polystyrene-based copolymer of claim 6, wherein the metallocene catalyst has a metallocenter, which is group 4 transition metal; the ligand is cyclopentadienyl or a derivative thereof, fluorenyl or a derivative thereof, or indenyl or a derivative thereof; and the catalyst has a bridge (ansa) structure or non-bridge structure.

* * * * *